(12) United States Patent
Kaneuchi et al.

(10) Patent No.: US 8,995,479 B2
(45) Date of Patent: Mar. 31, 2015

(54) LASER APPARATUS AND LASER PROCESSING METHOD

(75) Inventors: Yasuomi Kaneuchi, Yokohama (JP); Motoki Kakui, Yokohama (JP)

(73) Assignee: Megaopto Co., Ltd., Wako-shi (JP)

( * ) Notice: Subject to any disclaimer, the term of this patent is extended or adjusted under 35 U.S.C. 154(b) by 0 days.

(21) Appl. No.: 13/477,490

(22) Filed: May 22, 2012

(65) Prior Publication Data

US 2012/0307849 A1    Dec. 6, 2012

Related U.S. Application Data

(60) Provisional application No. 61/509,792, filed on Jul. 20, 2011.

(30) Foreign Application Priority Data

Jun. 3, 2011   (JP) ................................ P2011-125511

(51) Int. Cl.
*H01S 3/113*   (2006.01)
*B23K 26/06*   (2014.01)
*H01S 3/067*   (2006.01)
*H01S 3/00*    (2006.01)
*H01S 3/0941*  (2006.01)
*H01S 3/16*    (2006.01)
(Continued)

(52) U.S. Cl.
CPC ........... *B23K 26/063* (2013.01); *H01S 3/06758* (2013.01); *H01S 3/0057* (2013.01); *H01S 3/09415* (2013.01); *H01S 3/1618* (2013.01); *H01S 3/0064* (2013.01); *H01S 3/0078* (2013.01); *H01S 3/094007* (2013.01); *H01S 3/10023* (2013.01)
USPC ........................................................... 372/11

(58) Field of Classification Search
USPC ............................................................ 372/11
See application file for complete search history.

(56) References Cited

U.S. PATENT DOCUMENTS 5,535,049 A * 7/1996 Bowers et al. ................ 359/334
2001/0048706 A1 * 12/2001 Deichsel et al. .............. 372/107
(Continued)

FOREIGN PATENT DOCUMENTS

JP          04-304432 A      10/1992
JP         2008-060139 A      3/2008
(Continued)

OTHER PUBLICATIONS

International Preliminary Report on Patentability and Written Opinion in PCT International Application No. PCT/JP2012/062657, dated Dec. 19, 2013.
(Continued)

*Primary Examiner* — Colleen A Matthews
*Assistant Examiner* — Vu A Vu
(74) *Attorney, Agent, or Firm* — Venable LLP; Michael A. Sartori; Tamatane J. Aga (57) ABSTRACT

The present invention relates to a laser apparatus having a structure for removing a skirt portion contained in pulsed light, and a laser processing method using the laser apparatus. The laser apparatus comprises a MOPA fiber laser light source which outputs pulsed light having a skirt portion with a light intensity lower than a predetermined value, and a saturable absorber which removes a skirt portion from the pulsed light outputted from the MOPA fiber laser light source.

3 Claims, 7 Drawing Sheets (51) Int. Cl.
*H01S 3/094* (2006.01)
*H01S 3/10* (2006.01)

(56) References Cited

U.S. PATENT DOCUMENTS

| | | | |
|---|---|---|---|
| 2005/0163170 A1* | 7/2005 | Okhotnikov et al. | 372/6 |
| 2006/0227818 A1* | 10/2006 | Gubenko et al. | 372/18 |
| 2007/0280324 A1* | 12/2007 | Piccinno | 372/70 |
| 2008/0225907 A1* | 9/2008 | Diels et al. | 372/25 |
| 2009/0022189 A1* | 1/2009 | Okuno | 372/25 |
| 2010/0033548 A1* | 2/2010 | Kaneuchi et al. | 347/225 |
| 2010/0103961 A1* | 4/2010 | Yamazoe | 372/18 |
| 2010/0117009 A1 | 5/2010 | Moriya et al. | |
| 2010/0195193 A1* | 8/2010 | Taira et al. | 359/337.2 |
| 2010/0195677 A1* | 8/2010 | Fermann et al. | 372/6 |
| 2010/0296529 A1* | 11/2010 | Andersen et al. | 372/6 |

FOREIGN PATENT DOCUMENTS

| | | | |
|---|---|---|---|
| JP | 2009-152560 | 7/2009 | |
| WO | WO /2009/119585 | * 10/2009 | H01S 3/10 |
| WO | WO-2009/119585 A1 | 10/2009 | |
| WO | WO 2009119585 A1 | * 10/2009 | |

OTHER PUBLICATIONS

Extended European Search Report in European Application No. 12793882.7, dated Oct. 31, 2014.

* cited by examiner

LASER APPARATUS AND LASER PROCESSING METHOD

CROSS-REFERENCE TO RELATED APPLICATION

This application is based upon and claims the benefit of priorities from U.S. Provisional Application No. 61/509,792, filed on Jul. 20, 2011 and Japanese Patent Application No. 2011-125511, filed on Jun. 3, 2011, the entire contents of which are incorporated herein by reference.

BACKGROUND OF THE INVENTION

1. Field of the Invention

The present invention relates to a laser apparatus and a laser processing method.

2. Related Background Art

Laser light sources each outputting pulsed light are known. For example, the following Japanese Patent Application Laid-Open No. 2009-152560 (Patent Document 1) describes a pulsed light source that outputs pulsed light with a short pulse width, by amplifying pulsed light that is outputted from a semiconductor laser after attenuating one of the shorter wavelength side and the longer wavelength side with respect to a peak wavelength of pulsed light, in a wavelength band of the pulsed light.

SUMMARY OF THE INVENTION

The present inventors have examined the above prior art, and as a result, have discovered the following problems. That is, pulsed light outputted from the pulsed light source described in Patent Document 1 has skirt portions with low light intensities at both front and trail edges of a pulse waveform due to use of chirping components (mixture of chirping components of a plurality of longitudinal modes) by a seed light source. Therefore, when a target to be processed is processed by using such a pulsed light source, a harmful influence such as melting of the target to be processed may be caused, so that the target to be processed may not be sufficiently processed.

The present invention has been developed to eliminate the problems described above. It is an object of the present invention to provide a laser apparatus having a structure for enabling removal of a skirt portion contained in pulsed light, and a laser processing method using the laser apparatus.

A laser apparatus according to the present invention, as a first aspect, comprises a laser light source, and a saturable absorber. The laser light source outputs pulsed light having a skirt portion with a light intensity lower than a predetermined value. The saturable absorber inputs the pulsed light outputted from the laser light source, removes the skirt portion from the input pulsed light, and outputs the pulsed light from which the skirt portion has been removed.

As a second aspect applicable to the first aspect, the predetermined value may be a maximum light intensity at a fluctuation part of the skirt portion in the pulsed light. Further, as a third aspect applicable to at least one of the first and second aspects, the pulsed light outputted from the laser light source is comprised of a plurality of successive pulse components. In this case, the predetermined value defining the skirt portion of pulsed light is preferably set to a minimum light intensity between pulse components adjacent to each other among the plurality of pulse components.

In accordance with at least one of the first to third aspect or a combination of two or more of the first to third aspects, by inputting the pulsed light outputted from the laser light source into the saturable absorber, a skirt portion of the pulsed light can be removed.

As a fourth aspect applicable to at least one of the first to third aspects, the saturable absorber may include a saturable absorbing mirror disposed in an inclined state with respect to an optical axis of the input pulsed light. The saturable absorbing mirror preferably reflects the pulsed light when the light intensity of the input pulsed light is higher than a predetermined value. In this case, a skirt portion of the pulsed light outputted from the laser light source can be removed. By disposing the saturable absorbing mirror in an inclined state with respect to the optical axis of the input pulsed light, the laser light source can be prevented from being damaged by reflected light.

As a fifth aspect applicable to at least one of the first to third aspects, the saturable absorber may include a carbon nanotube. In this case, a skirt portion of the pulsed light outputted from the laser light source can also be removed.

A laser processing method according to the present invention uses the laser apparatus having the above-described structure (laser apparatus configured according to at least one of the first to fifth aspects or a combination of two or more of the first to fifth aspects). The laser processing method processes a target to be processed, by irradiating the target to be processed with the pulsed light outputted from the laser light source. In accordance with the laser processing method, the pulsed light from which a skirt portion has been removed is irradiated onto a target to be processed, so that melting of the target to be processed can be suppressed, and removal processing of the target to be processed is enabled.

DESCRIPTION OF THE PREFERRED EMBODIMENTS

In the following, embodiments of the present invention is described in detail with reference to the attached drawings. In the description of the drawings, elements identical to or equivalent to each other are denoted with the same reference numerals, and overlapping description is omitted.

Figure 1:
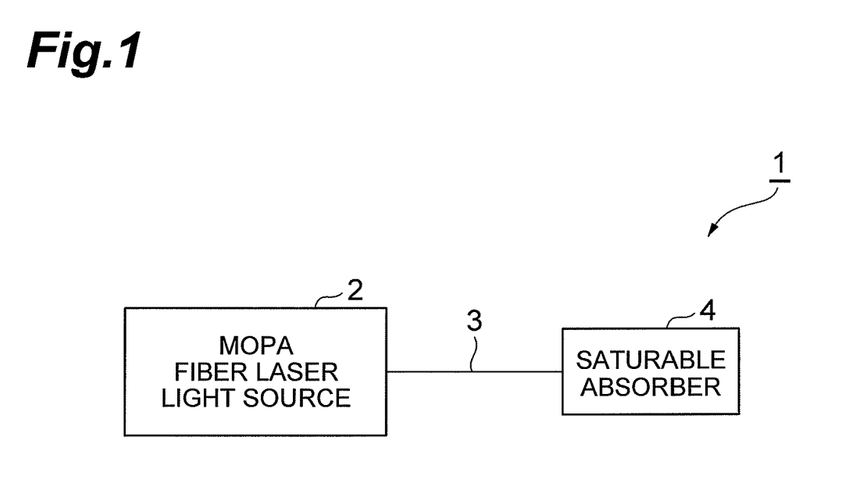
FIG. 1 is a view schematically showing a configuration of an embodiment of a laser apparatus according to the present invention.

FIG. 1 is a view schematically showing a configuration of an embodiment of laser apparatus according to the present invention. As shown in FIG. 1, the laser apparatus 1 comprises a MOPA (Master Oscillator Power Amplifier) fiber laser light source 2, a delivery optical fiber 3, and a saturable absorber 4. The laser apparatus 1 outputs pulsed light with a wavelength near 1060 nm preferable for laser processing. The delivery optical fiber 3 is not always necessary and may not be provided. The delivery optical fiber 3 may be provided on the output side of the saturable absorber 4.

Figure 2:
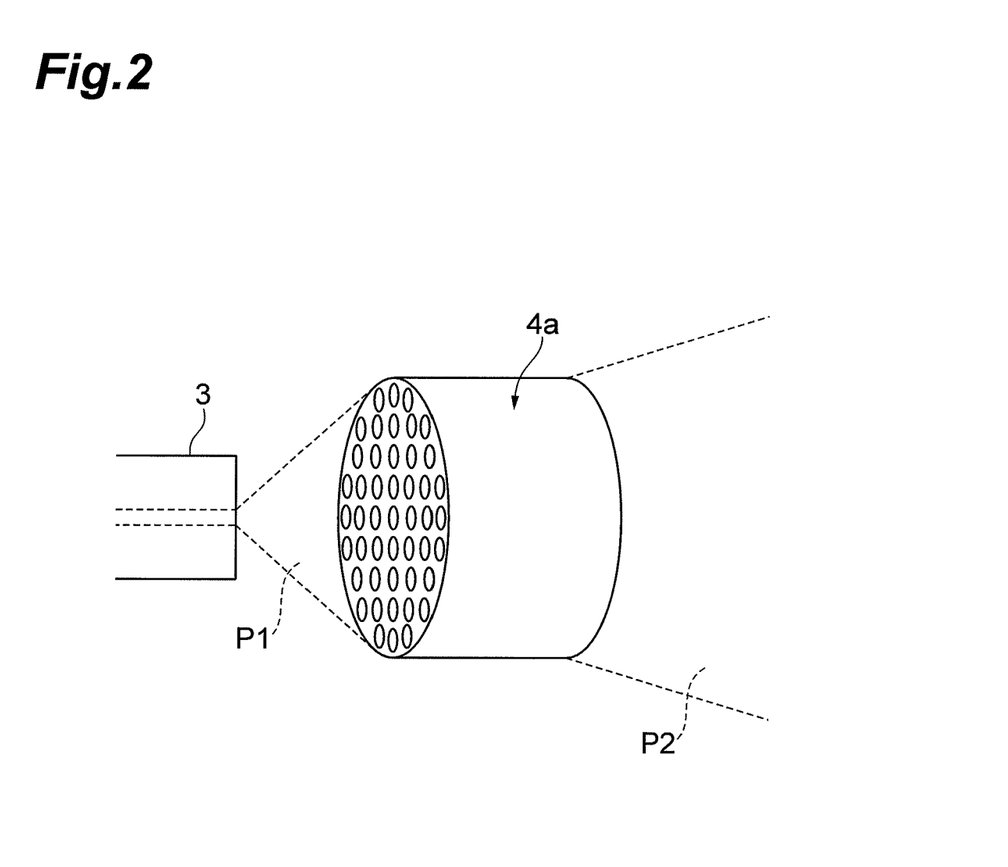
FIG. 2 is a view showing an example of application of a carbon nanotube as an example of a saturable absorber in the laser apparatus according to the present embodiment.

FIG. 2 is a view showing an example of application of a carbon nanotube 4a as an example of the saturable absorber 4 shown in FIG. 1. In FIG. 2, pulsed light P1 outputted from the delivery optical fiber 3 is pulsed light with skirt portions whose light intensities are lower than a predetermined value, and by passage of this pulsed light through the carbon nanotube 4a, pulsed light P2 from which the skirt portions are removed is obtained.

Figure 3:
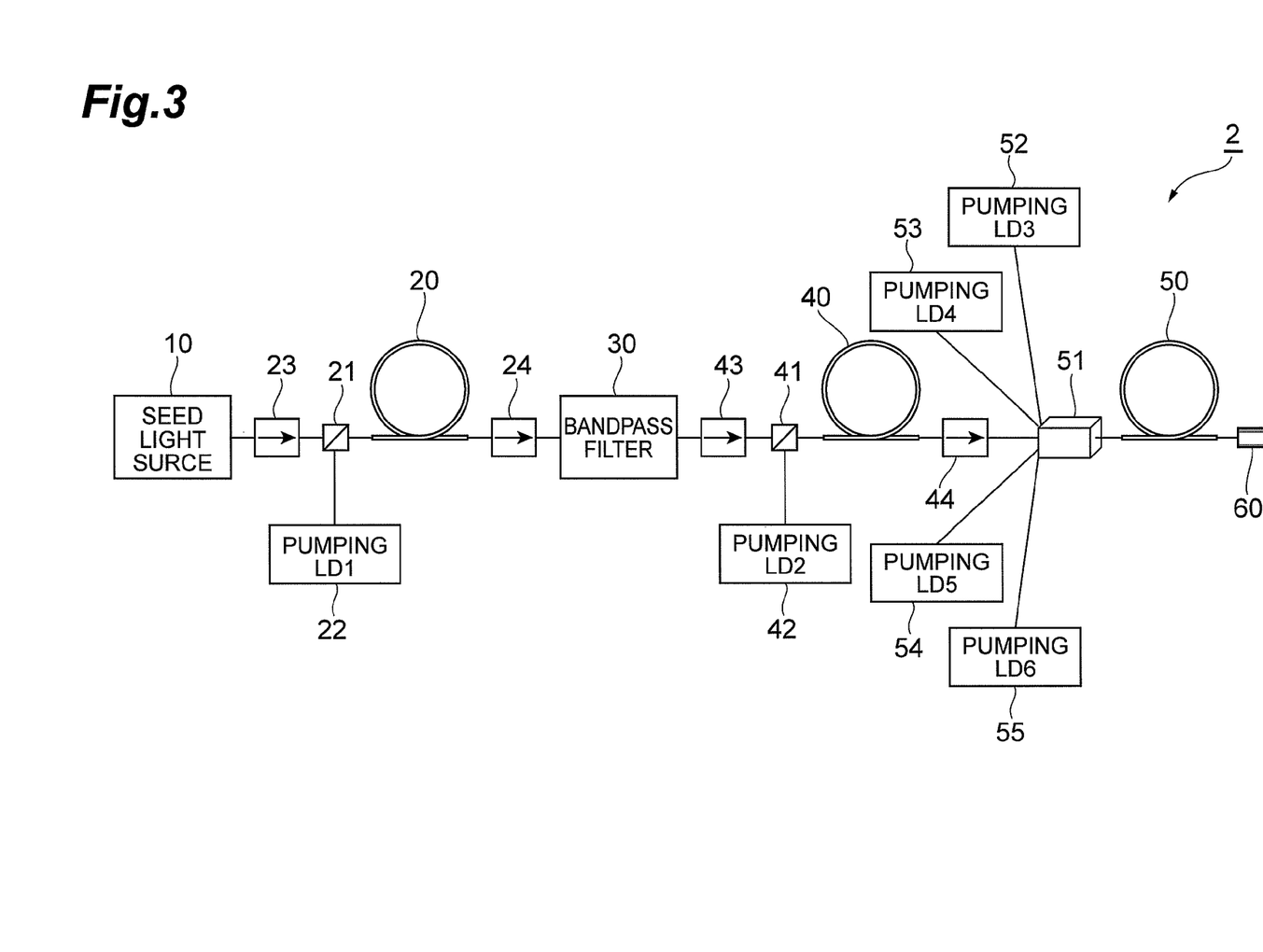
FIG. 3 is a view showing an example of a configuration of a MOPA fiber laser light source of laser apparatus according to the present embodiment.

The MOPA fiber laser light source 2 outputs pulsed light with a short pulse width, by attenuating one of the shorter wavelength side and the longer wavelength side with respect to a peak wavelength of pulsed light, in a wavelength band of pulsed light outputted from a seed light source, and then amplifying the pulsed light whose wavelength band is partially attenuated. FIG. 3 is a view showing an example of a configuration of the MOPA fiber laser light source 2. As shown in FIG. 3, the MOPA fiber laser light source 2 has a MOPA structure, and comprises a seed light source 10, a YbDF (Yb-Doped Fiber) 20, a bandpass filter 30, a YbDF 40, and a YbDF 50, and the like.

The seed light source 10 includes a semiconductor laser that is directly modulated and outputs pulsed light. The semiconductor laser is preferably a Fabry-Perot semiconductor laser with the object of realizing higher power or avoiding a nonlinear effect such as stimulated Brillouin scattering (SBS). The semiconductor laser outputs pulsed light with a wavelength near 1060 nm at which the YbDFs 20, 40, and 50 serving as an amplification optical fiber have gains. The YbDFs 20, 40, and 50 are optical amplification media obtained by doping the cores of optical fibers mainly composed of silica glass with a Yb element as an active material. The YbDFs 20, 40, and 50 are advantageous in power conversion efficiency because the wavelengths of pumping light and the light to be amplified are close to each other, and advantageous because they have high gains at a wavelength near 1060 nm. These YbDFs 20, 40, and 50 constitute an optical fiber amplifier with a three-stage structure.

To the YbDF 20 of the first stage, the pumping light that passed through an optical coupler 21 from a pumping light source 22 is supplied in the forward direction. In addition, into the YbDF 20, the pulsed light that passed through an optical isolator 23 and the optical coupler 21 from the seed light source 10 is inputted. By this, the input pulsed light is amplified in the YbDF 20, and the amplified pulsed light obtained is outputted through the optical isolator 24.

The bandpass filter 30 receives the pulsed light that is outputted from the seed light source 10 and amplified by the YbDF 20 at the first stage. The bandpass filter 30 attenuates one of the shorter wavelength side and the longer wavelength side with respect to a peak wavelength of the pulsed light, in the wavelength band of the pulsed light, and outputs the pulsed light whose wavelength band is partially attenuated. A high-pass filter or a low-pass filter may be used instead of the bandpass filter, however, the high-pass filter can extract only the longer wavelength side of the seed light source spectrum, and the low-pass filter can extract only the shorter wavelength side of the seed light source spectrum. The bandpass filter performs both of these functions, so that it is preferable.

To the YbDF 40 of the second stage, the pumping light that passed through the optical coupler 41 from the pumping light source 42 is supplied in the forward direction. In addition, into the YbDF 40, the pulsed light that passed through the optical isolator 43 and the optical coupler 41 from the bandpass filter 30 is inputted. By this, the input pulsed light is amplified in the YbDF 40, and the amplified pulsed light obtained is outputted through the optical isolator 44. To the YbDF 50 of the third stage, the pumping light that passed through a combiner 51 from pumping light sources 52 to 55, respectively, is supplied in the forward direction. In addition, into the YbDF 50, the pulsed light amplified by the YbDF 40 of the second stage is inputted. This input pulsed light is further amplified in the YbDF 50, and outputted to the outside of the laser apparatus 1 through an end cap 60.

A more preferred configuration example is as follows. For the YbDF 20 of the first stage, a core-pumping type is adopted, and the pumping light with a pumping wavelength of 975 nm and constant power of 200 mW is injected therein in the forward direction. As the YbDF 20, a YbDF whose unsaturated absorption coefficient for a wavelength of 975 nm is 240 dB/m is used with a length of 5 m. The YbDF 20 has a core diameter of 6 μm and NA of approximately 0.12. For the YbDF 40 of the second stage, a core-pumping type is adopted, and the pumping light with a pumping wavelength of 975 nm and constant power of 200 mW is injected therein in the forward direction. As the YbDF 40, a YbDF whose unsaturated absorption coefficient for a wavelength of 975 nm is 240 dB/m is used with a length of 7 m. The YbDF 40 has a core diameter of 6 μm and NA of approximately 0.12. For the YbDF 50 of the third stage, a cladding-pumping type is adopted, and the pumping light with a pumping wavelength of 975 nm and power of 20 W (four 5 W-class pumping LDs) is injected therein in the forward direction. As the YbDF 50, a YbDF whose core has an unsaturated absorption coefficient of 1200 dB/m is used with a length of 5 m. The core of the YbDF 50 has a diameter of 10 μm and NA of approximately 0.06. The inner cladding of the YbDF 50 has a diameter of 125 μm and NA of approximately 0.46.

Referring to FIG. 1 again, the delivery optical fiber 3 is provided between the end cap 60 and the saturable absorber 4 of the MOPA fiber laser light source 2, and introduces the pulsed light outputted from the MOPA fiber laser light source 2 to the saturable absorber 4. The delivery optical fiber 3 is not always necessary, and the saturable absorber 4 may be directly connected to the end cap 60 of the MOPA fiber laser light source 2.

The saturable absorber 4 is a member that functions as an absorber strong (high transmission loss) against input light with a low light intensity, and functions as an absorber weak (low transmission loss) against input light with a high light intensity, and includes, for example, a carbon nanotube (refer to FIG. 2). In other words, the saturable absorber 4 has characteristics the light transmission loss of which becomes smaller as the light intensity increases. The saturable absorber 4 inputs the pulsed light outputted from the MOPA fiber laser light source 2 through the delivery optical fiber 3, and shapes the waveform of the pulsed light, and outputs it to the outside. Preferably, the saturable absorber 4 has a transmission loss as a weak absorber equal to or more than the light intensities of skirt portions of the input pulsed light, and has a small influence on the FWHM (full width at half maximum) which is the half width value of the pulse width. The saturable absorber 4 may be capable of completely removing skirt portions of the input pulsed light, however, taking lowering of the output of the pulsed light into account, the saturable absorber may remove the skirt portions to an extent at which even if the skirt portions are left, they do not pose a problem.

Figure 4A:
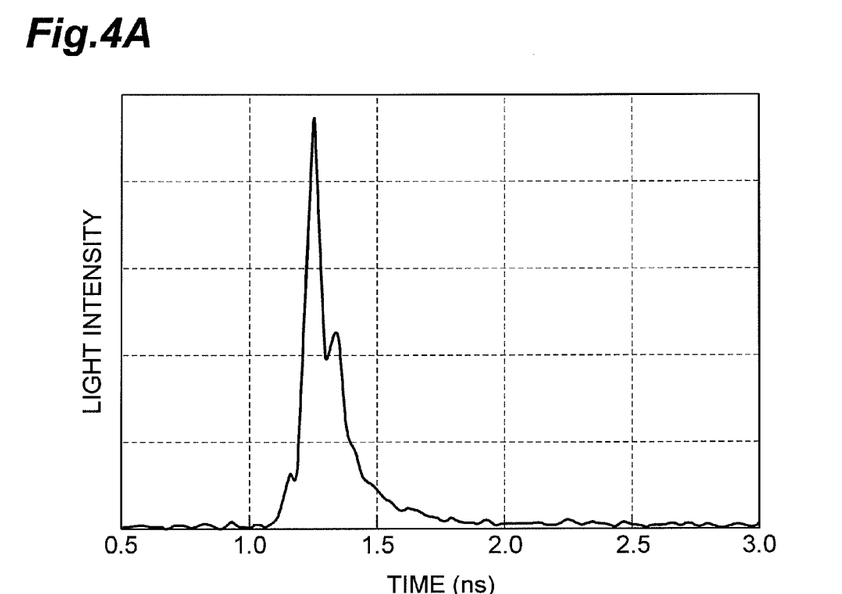
FIG. 4A is a view showing an example of a waveform of pulsed light outputted from the MOPA fiber laser light source of the laser apparatus according to the present embodiment.
Figure 4B:
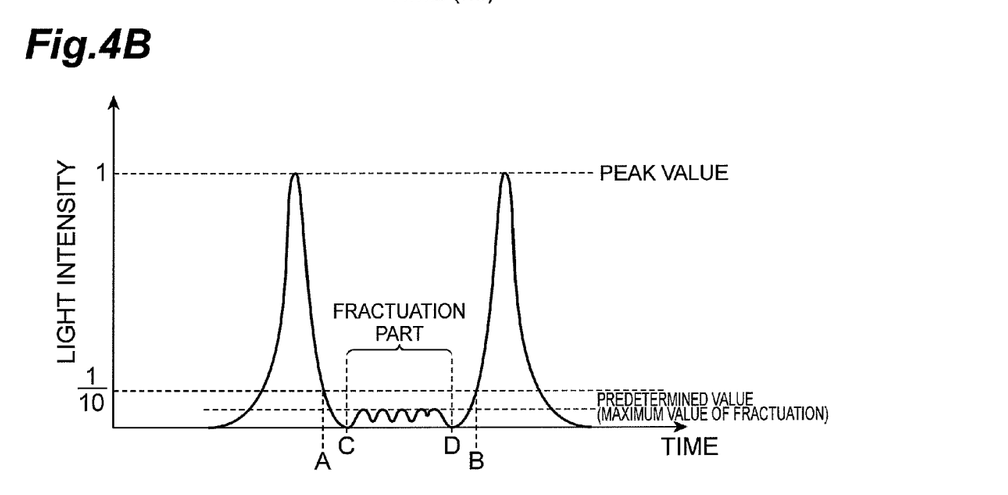
FIG. 4B is a view for explaining skirt portions and fluctuation of the output pulsed light.

FIG. 4A is a view showing an example of a waveform of pulsed light outputted from the MOPA fiber laser light source 2, and FIG. 4B is a view for describing skirt portions and fluctuation of output pulsed light. As shown in FIG. 4A, the pulsed light outputted from the MOPA fiber laser light source 2 has skirt portions with low light intensities at both front and trail edges of the pulse waveform. The pulsed light having such a pulse waveform is inputted into the saturable absorber 4 through the delivery optical fiber 3. The output pulsed light is, as shown in FIG. 4B, composed of a plurality of pulses repeatedly outputted two times or more (in this figure, only two pulse are shown). Therefore, in the present specification, a skirt portion of pulsed light is defined by a region lower than a predetermined intensity (a predetermined value) of the skirt portion between adjacent among the plurality of pulses. The predetermined value defining a skirt portion may be a predetermined intensity that is $1/10$ or less of the peak intensity of pulsed light. Specifically, when the predetermined value is set at $1/10$ of the peak value, the part sandwiched by the point A and the point B in FIG. 4B corresponds to a skirt portion. Or, a maximum value of the fluctuation part in the skirt portion may be set as the predetermined value. The fluctuation part indicates a significant light intensity after a skirt portion in the wake of a pulse peak once become a minimum value. In the concrete, when assuming the points C and D in FIG. 4B as a minimum value of the skirt portion, the fluctuation part exists between the points C and D. As an example, in the case of the pulse waveform shown in FIG. 4A, a point near 2.0 ns corresponds to the point C in FIG. 4B.

Figure 5:
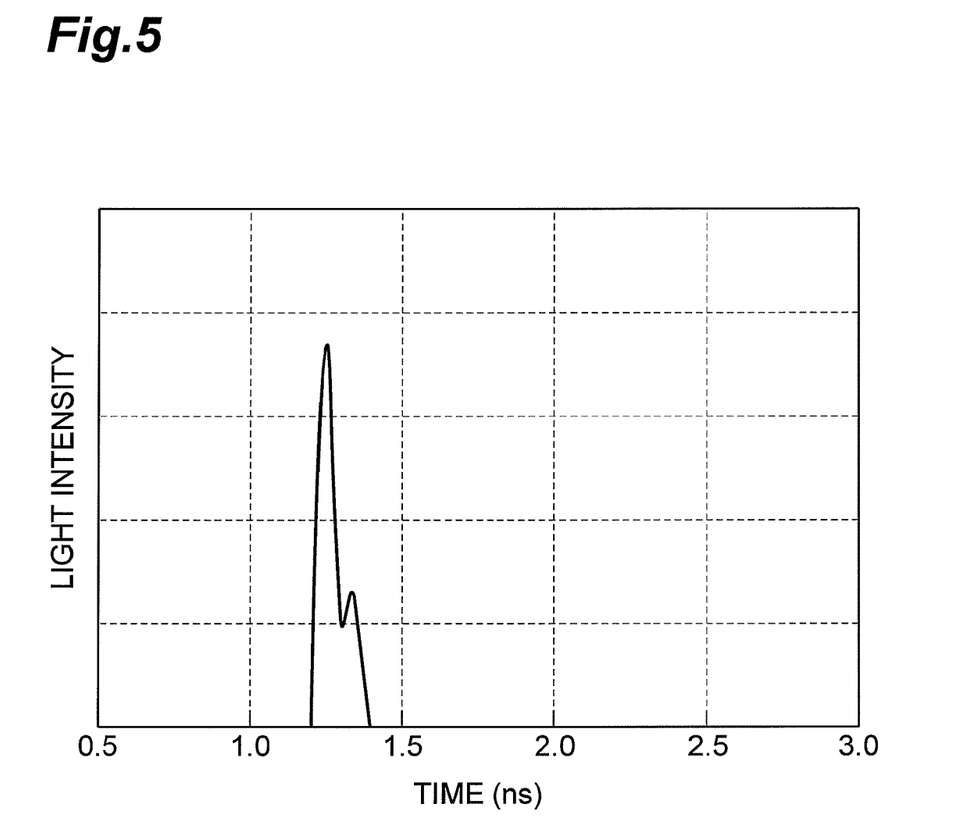
FIG. 5 is a view showing an example of a waveform of pulsed light outputted from the saturable absorber of the laser apparatus according to the present embodiment.

FIG. 5 is a view showing an example of a waveform of pulsed light outputted from the saturable absorber 4. As shown in FIG. 5, the pulsed light outputted from the saturable absorber 4 has a waveform obtained by removing the skirt portions from the input pulsed light into the saturable absorber 4. Thus, the saturable absorber 4 removes skirt portions of the input pulsed light, and on the other hand, the saturable absorber 4 transmits the pulsed light except for the skirt portions, so that pulsed light outputted from the saturable absorber 4 has no skirt portions.

For a laser processing method according to the present embodiment, the laser apparatus 1 having the above-described structure is used, and a target to be processed is processed by irradiating the target to be processed with the pulsed light outputted from the laser apparatus 1. At this time, individual pulse components outputted from the laser apparatus 1 are waveform-shaped so that they have no skirt portions and irradiated onto the target to be processed, and accordingly, the target to be processed is subjected to removable processing.

Thus, by providing the saturable absorber 4 on the output side of the MOPA fiber laser light source 2, the laser apparatus 1 becomes capable of removing skirt portions of pulsed light. Then, when the pulsed light outputted from this laser apparatus 1 is irradiated onto the target to be processed, melting, etc., of the target to be processed can be suppressed, and removal processing of the target to be processed is enabled. As a result, the processing quality of the target to be processed is improved.

The laser apparatus and laser processing method according to the present invention are not limited to those according to the present embodiment described above. For example, the laser light source of the laser apparatus 1 is not necessarily a MOPA type as long as it outputs pulsed light.

In the embodiment described above, the delivery optical fiber 3 is provided between the MOPA fiber laser light source 2 and the saturable absorber 4, however, it is also possible that the saturable absorber 4 is provided on the end cap 60 of the MOPA fiber laser light source 2, and the delivery optical fiber 3 is provided at the output terminal of the saturable absorber 4.

Figure 6A:
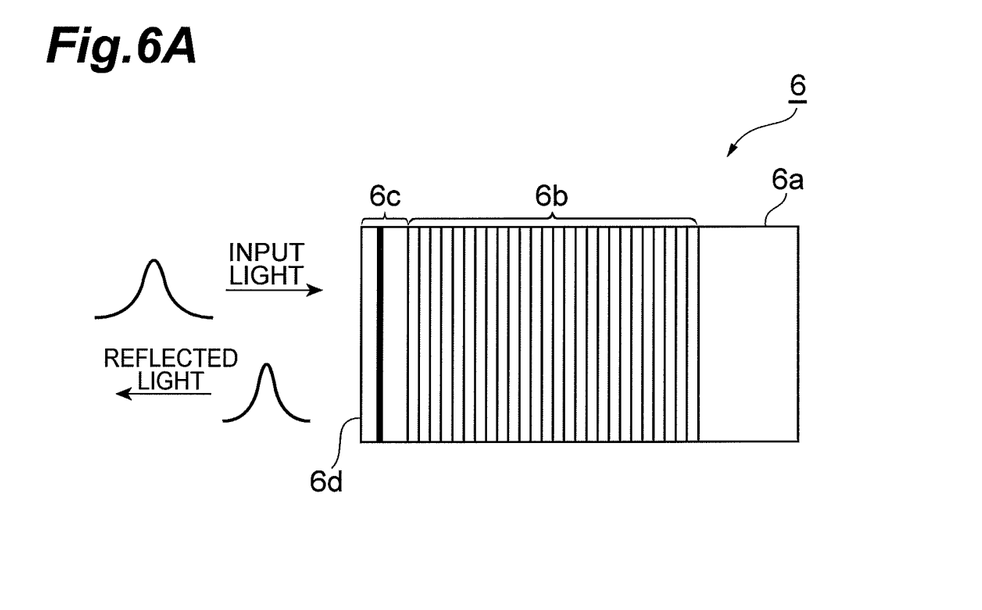
FIG. 6A is a view showing an example of a configuration of a saturable absorbing mirror.

A saturable absorbing mirror may be applied as the saturable absorber 4. FIG. 6A is a view schematically showing a configuration of the saturable absorbing mirror. As shown in FIG. 6A, the saturable absorbing mirror 6 is a member that reflects input light with a light intensity higher than a predetermined value and that includes a reflecting mirror 6b and a saturable absorber 6c. The saturable absorbing mirror 6 is configured so that, for example, the reflecting mirror 6b is provided on the principal surface of a GaAs substrate 6a, and the saturable absorber 6c is provided on the reflecting surface of the reflecting mirror 6b. This reflecting mirror 6b is a GaAs/AlAs Bragg reflecting mirror formed by alternately arranging, for example, AlAs layers and GaAs layers. The saturable absorber 6c has characteristics similar to those of the above-described saturable absorber 4, and is constituted by, for example, an InGaAs layer of a quantum well structure. When the light intensity of input pulsed light into the saturable absorbing mirror 6 is higher than a predetermined value, the pulsed light is not absorbed by the saturable absorber 6c but transmitted through it. The pulsed light transmitted through the saturable absorber 6c is reflected by the reflecting mirror 6b, transmitted through the saturable absorber 6c and then outputted from the reflecting surface 6d that is the principal surface of the saturable absorber 6c.

Figure 6B:
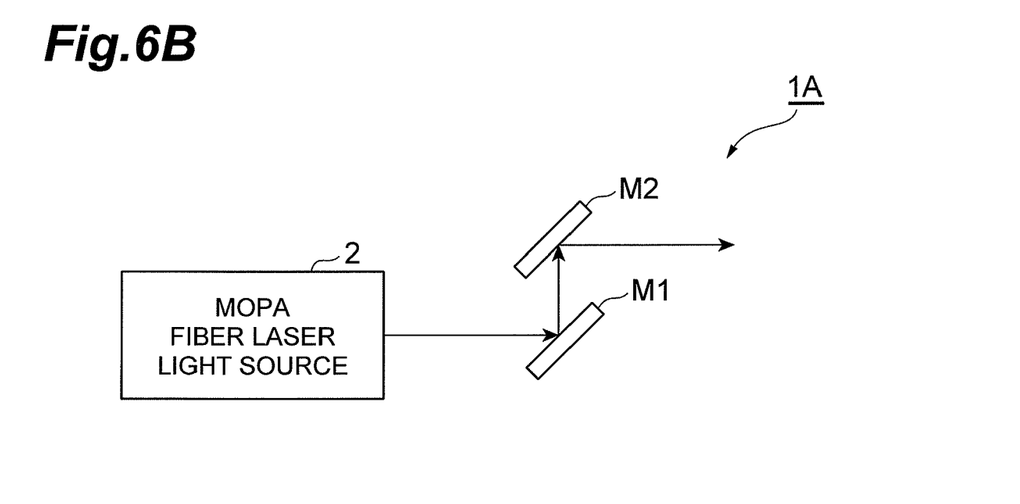
FIG. 6B is a view showing an example of a configuration of laser apparatus using the saturable absorbing mirror.

FIG. 6B is a view showing an example of a configuration of laser apparatus using a saturable absorbing mirror. As shown in FIG. 6B, the laser apparatus 1A comprises a MOPA fiber laser light source 2, a first mirror M1, and a second mirror M2. The first mirror M1 is the saturable absorbing mirror 6 described above, and disposed in an inclined state at, for example, 45 degrees with respect to the optical axis of the pulsed light outputted from the MOPA fiber laser light source 2. The second mirror M2 is disposed in an inclined state at, for example, 45 degrees with respect to the optical axis of the reflected light reflected by the first mirror M1.

In the laser apparatus 1A configured as described above, the pulsed light outputted from the MOPA fiber laser light source 2 first reaches the first mirror M1. Then, skirt portions are removed from the pulsed light that reached the first mirror M1 by the first mirror M1 and the pulsed light is reflected in a direction orthogonal to the incident direction. Next, the pulsed light reflected by the first mirror M1 reaches the second mirror M2, and is reflected in a direction orthogonal to the incident direction. By this, the laser apparatus 1A outputs pulsed light substantially parallel to the optical axis of the pulsed light outputted from the MOPA fiber laser light source 2.

Thus, the saturable absorbing mirror 6 is disposed in an inclined state with respect to the optical axis of input pulsed light. In this case, the MOPA fiber laser light source 2 can be prevented from being damaged by the pulsed light reflected by the saturable absorbing mirror 6. The saturable absorber 6c may be formed by using a carbon nanotube. The second mirror M2 is not always necessary, and it is not necessary if there is no need to output pulsed light parallel to the optical axis of pulsed light outputted from the MOPA fiber laser light source 2. Further, instead of the first mirror M1, the second mirror M2 may be the saturable absorbing mirror 6.

Figure 7:
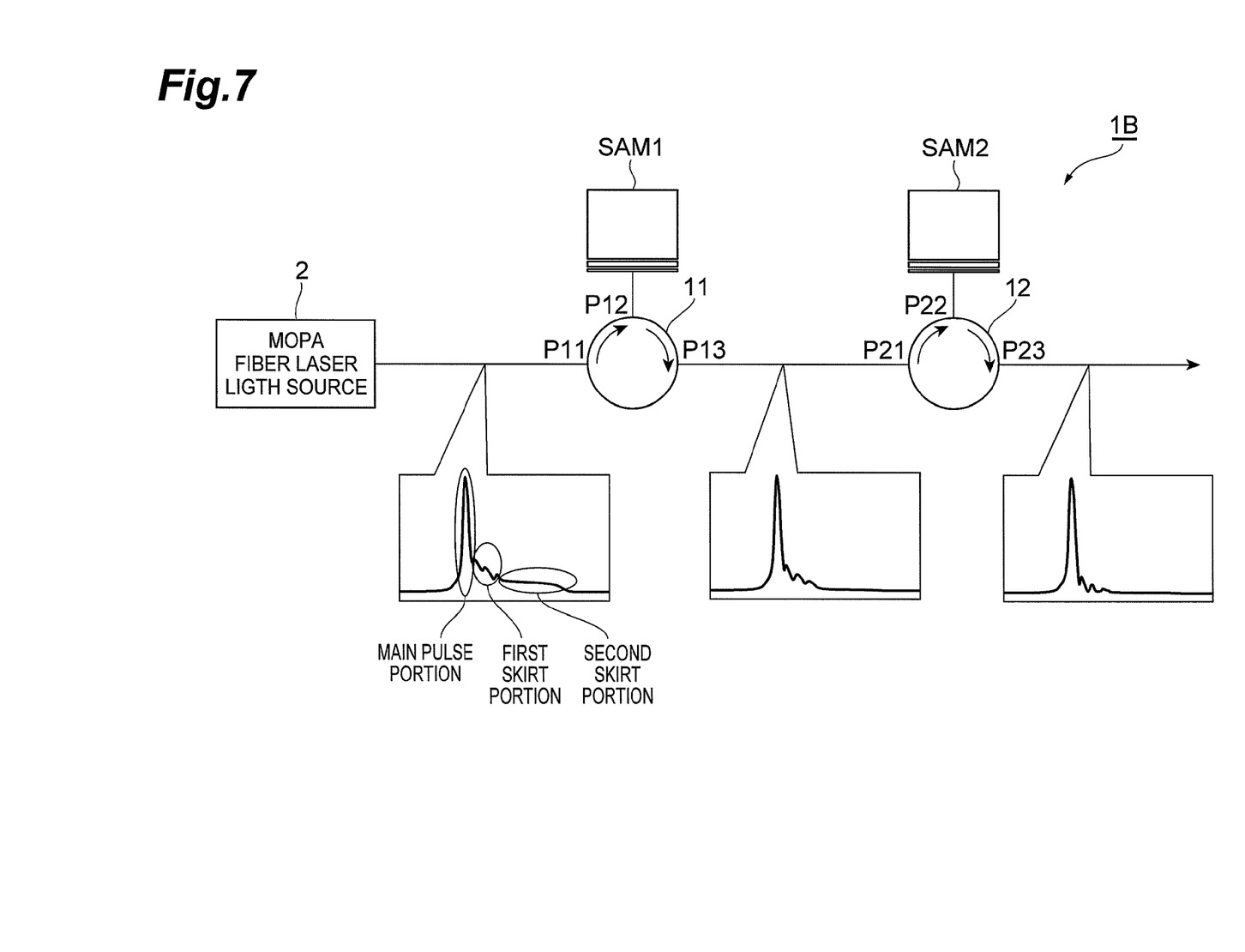
FIG. 7 is a view showing another example of a configuration of laser apparatus to which the saturable absorbing mirror is applied.

FIG. 7 is a view showing another example of a configuration of laser apparatus using saturable absorbing mirrors. As shown in FIG. 7, laser apparatus 1B includes a MOPA fiber laser light source 2, a first saturable absorbing mirror SAM1, a second saturable absorbing mirror SAM2, a first optical circulator 11, and a second optical circulator 12. In the laser apparatus 1B, pulsed light outputted from the MOPA fiber laser light source 2 has a main pulse portion, a first skirt portion, and a second skirt portion. In this first skirt portion, an average light intensity is equal to or less than a first value and larger than a second value (<first value), and in the second skirt portion, an average light intensity is equal to or less than the second value. The first saturable absorbing mirror SAM1 can reduce but cannot remove the first skirt portion, and can remove the second skirt portion.

The pulsed light outputted from the MOPA fiber laser light source 2 is inputted into a first port P11 of the first optical circulator 11, and outputted from a second port P12. The pulsed light outputted from the second port P12 of the first optical circulator 11 reaches the first saturable absorbing mirror SAM1, and the first skirt portion is reduced and the second skirt portion is removed by the first saturable absorbing mirror SAM1, and thereafter, the pulsed light is reflected. The pulsed light reflected by the first saturable absorbing mirror SAM1 is inputted into the second port P12 of the first optical circulator 11, and outputted from a third port P13.

Then, the pulsed light outputted from the third port P13 of the first optical circulator 11 is inputted into a first port P21 of the second optical circulator 12, and outputted from a second port P22. The pulsed light outputted from the second port P22 of the second optical circulator 12 reaches the second saturable absorbing mirror SAM2, and reflected after the first skirt portion is further reduced by the second saturable absorbing mirror SAM2. The pulsed light reflected by the second saturable absorbing mirror SAM2 is inputted into a second port P22 of the second optical circulator 12, and outputted from a third port P23.

In the laser apparatus 1B, by the first saturable absorbing mirror SAM1, the second skirt portion of pulsed light is removed, and the first skirt portion is reduced. Then, by the second saturable absorbing mirror SAM2, the first skirt portion of the pulsed light is further reduced. Thus, by adopting two-stage arrangement of saturable absorbing mirrors in the laser apparatus 1B, skirt portions in pulsed light outputted from the MOPA fiber laser light source 2 can be further reduced. Further, the pairs of optical circulators and saturable absorbing mirrors may be connected in multiple stages.

As described above, in accordance with the present invention, a skirt portion contained in pulsed light can be removed.

What is claimed is:

1. A laser apparatus, comprising:
a laser light source which outputs pulsed light having a skirt portion with a light intensity lower than a predetermined value; and
a light path changer which changes light path of the pulsed light outputted, from the laser light source from a first light path to a second light path that is different from and in parallel to the first light path, the light path changer comprising:
a first saturable absorbing mirror provided on the first light path and at a position where the pulsed light outputted from the laser light source reaches, the first saturable absorbing mirror reflecting the pulsed light, which has propagated along the first light path, in a third light path different from the first and second light paths, after removing first part from the skirt portion of the pulsed light, the first part having a light intensity lower than the predetermined value; and
a second saturable absorbing mirror provided on the second light path and at a position where the pulsed light reflected by the first saturable absorbing mirror reaches, the second saturable absorbing mirror reflecting the pulsed light, which has propagated along the third light path, in the second light path, after removing second part from the remaining skirt portion in which the first part is removed, the second part having a light intensity lower than the predetermined value,
wherein each of the first and second saturable absorbing mirrors has: a substrate composed of a material preventing the pulsed light passing therethrough; a saturable absorber provided on a main surface of the substrate, the saturable absorber having an entrance surface on which the pulsed light is incident, and a rear surface opposing the entrance surface; and a Bragg reflecting mirror provided between the main surface of the substrate and the rear surface of the saturable absorber, and
wherein each of the first and second saturable absorbing mirrors are disposed so that the entrance surface of the saturable absorber therein inclines with respect to the first to third light paths.

2. The laser apparatus according to claim 1, wherein the pulsed light outputted from the laser light source is comprised of a plurality of successive pulse components, and
wherein the predetermined value is set to a minimum light intensity between pulse components adjacent to each other among the plurality of pulse components.

3. A laser processing method of processing a target to be processed, by irradiating the target to be processed with pulsed light outputted from the laser apparatus according to claim 1.

* * * * *